United States Patent [19]

Sugihara et al.

[11] 3,730,981

[45] May 1, 1973

[54] COLOR TELEVISION RECEIVER

[76] Inventors: Yasumasa Sugihara; Akira Horaguchi, both of c/o The General Corporation, 1116 Suenaga, Kawasaki-shi, Kanagawa-ken, Japan

[22] Filed: June 1, 1971

[21] Appl. No.: 148,724

[30] Foreign Application Priority Data

Jan. 29, 1971 Japan ....................46/3387
Mar. 2, 1971 Japan ....................46/11178

[52] U.S. Cl. ....................178/5.4 P
[51] Int. Cl. ....................H04n 9/44
[58] Field of Search ....................178/5.4 P; 329/50

[56] References Cited

UNITED STATES PATENTS 3,553,357 1/1971 Carnt ....................178/5.4 P

*Primary Examiner*—Richard Murray
*Attorney*—Ernest A. Greenside

[57] ABSTRACT

A color television receiver for use in a transmission system such as PAL system in which a pair of color signals provides quadrature balanced modulation of a color subcarrier simultaneously with respect to mutually orthogonal modulation axes with one of the axes being reversed by 180° for alternate horizontal scanning lines and in which the resulting color television signal contains a color burst signal capable of providing distinction of the polarity of the color subcarrier that is phase alternating, the receiver using two reference subcarriers indicating the demodulation axes during demodulation of the chrominance signal, one of said reference subcarriers reverting its phase in consecutive horizontal scanning lines by 180° in correspondence to the respective modulation axis, characterized in that for generating the reference subcarrier having an alternating phase a subcarrier of a frqeuency of fsc±(2$n$−1)/2 fH is generated, where fsc denotes the color subcarrier frequency, fH the horizontal scanning frequency and $n$ positive integer, and this subcarrier is so modulated in a phase modulating means with a sawtooth wave of horizontal scanning frequency that its phase during each line keeps constant relative to the other reference subcarrier.

7 Claims, 12 Drawing Figures

COLOR TELEVISION RECEIVER

The invention relates to a color television receiver for use in a transmission system such as PAL (Phase Alternation Line) system in which a pair of color signals provide quadrature balanced modulation of color subcarrier simultaneously with respect to mutually orthogonal modulation axes with one of the axes being reversed by 180° for successive scanning lines.

A color television receiver for receiving a color television signal of PAL system requires two kinds of reference subcarriers in the demodulation of the chrominance signal to derive the two color signals therefrom. This is because one of the subcarriers reverses 180° in its phase for every period of horizontal scanning line (hereafter referred to as "line period"). One of the reference subcarriers should have a change in phase of 180° between successive line periods and should maintain a constant phase relationship with the chrominance signal received or more correctly with the color burst.

It is known to facilitate maintaining such phase relationship automatically by varying the phase of the color synchronizing signal or color burst contained in a color television signal by +45° and −45° alternately with respect to a reference phase for successive line periods.

The two reference subcarriers which are required to demodulate chrominance signal are produced in a variety of different manners. One typical method employed for obtaining a reference subcarrier to be used in the demodulation of R-Y axis in a conventional color television receiver of PAL system is to extract from the color television signal the color synchronizing signal which is then subjected to phase demodulation to provide an identification control voltage of a frequency which is one-half the horizontal scanning frequency. A square wave generator is provided which is synchronized with the control voltage and produces an output that is utilized as a power supply to a line frequency switch.

The switch acts to provide a switching, for alternate line periods, between two outputs having a phase difference of 180° from a local oscillator that is synchronized with the fundamental frequency of a color burst signal received.

It is an object of the invention to provide an improved color television receiver which eliminates the need for the provision of a switch conventionally employed to provide 180° alternation of the phase of one of the reference subcarriers used in the demodulation of the chrominance signal.

In accordance with the invention, the local oscillator used to produce one of reference carriers which provides demodulation of R-Y component has an oscillation frequency which is by one-half the horizontal scanning frequency higher or lower than the color subcarrier frequency. The oscillator output is therefore unequal to the color subcarrier frequency, and for this reason, that local subcarrier which is used according to the invention for the demodulation of R-Y component is referred to herein as "offset subcarrier" to make a distinction from the corresponding reference color subcarrier used in the prior art. To operate the synchronous demodulation in a normal manner, the output from the above mentioned local oscillator is subjected to phase modulation by saw-tooth wave of a frequency which is equal to the horizontal scanning frequency so that for the trace period of each individual horizontal scanning line, there is maintained a fixed phase difference, including a phase difference of zero degree, between the instantaneous reference subcarrier, that is, the above mentioned offset subcarrier which has undergone such phase modulation and color subcarrier, thereby enabling the demodulation of the chrominance signal to derive a desired color signal. At this end, a phase modulation circuit is provided to fix the phase of the reference carrier during one trace time. This system is completely different and distinct from the conventional method by which two reference subcarriers of alternately opposite phase for successive horizontal scanning lines are produced, i.e., by switching from one output of a local oscillator having a frequency and a phase coinciding with those of the chrominance subcarrier, or more correctly coinciding with the frequency of the color burst and having a particular phase difference with the latter, to the other output of the oscillator that is displaced by 180° in phase from said one output.

The invention depends for its operation upon the fact that the frequency spectrum of the color synchronizing signal contained in the color television signal of PAL system includes as first upper and lower side-bands those frequency components which are offset from the color subcarrier frequency, fsc, by one-half the horizontal scanning frequency, fH, so that it is a simple matter to achieve synchronization with either one of these side-bands of the output from the local oscillator that has one of the oscillation frequencies fsc ± ½fH, and also the fact that when such oscillator output is phase modulated by a saw-tooth wave of the horizontal scanning frequency, the phase difference between the instantaneous reference subcarrier, and color subcarrier of R-Y modulation can be kept constant for a limited time that corresponds to the trace time, by suitable choice of the direction and magnitude of the phase shift.

Therefore, the invention resides in the use, in a color television receiver adapted to demodulate a chrominance signal produced by quadrature balance modulation with two color signals, of a local oscillator having an oscillation frequency (fsc ± ½fH) which is offset from the color subcarrier frequency and which is maintained in synchronism with one of the sidebands of the color synchronizing signal, and of a phase modulator which provides phase modulation of the offset subcarrier with a sawtooth wave of the scanning line frequency to maintain a fixed fase difference between the resulting instantaneous reference subcarrier and the color subcarrier during the trace time, thereby allowing the instantaneous reference subcarrier to be used in the R-Y axis demodulation.

In addition, in order to maintain a phase difference of ± 90° between the both reference subcarriers used in B-Y and R-Y axis demodulation during the trace time, the invention provides an automatic phase control using the voltage that is obtained by phase detection of a signal having a phase difference of a suitable amount with respect to either of these reference subcarriers, as a control voltage.

For a better understanding of the invention, embodiments thereof will be described in more detail below with reference to the drawings, in which.

Figure 2:
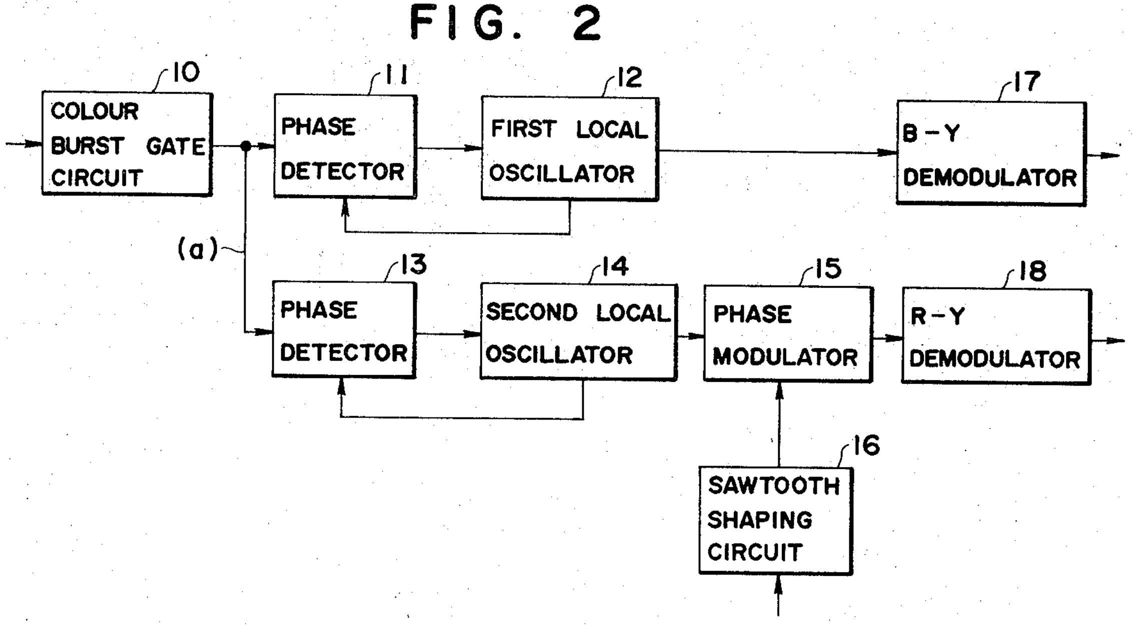
FIG. 2 is a block diagram of an embodiment of the invention.
Figure 3A:
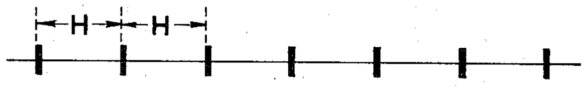
Figure 3B:
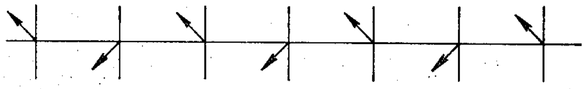
Figure 4:
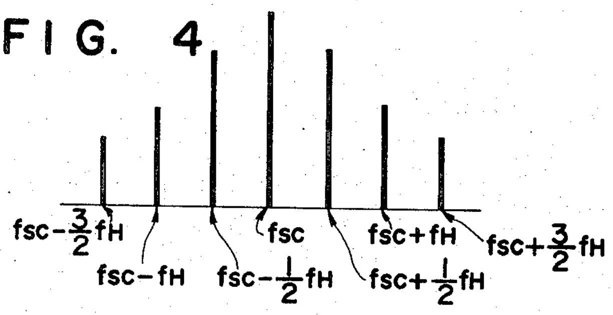
Figure 6:
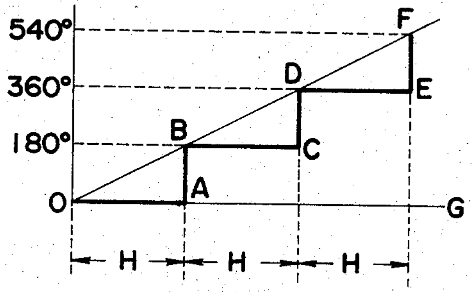
Figure 5:
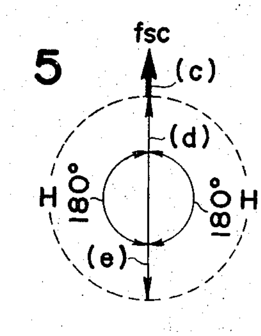
Figure 6A:
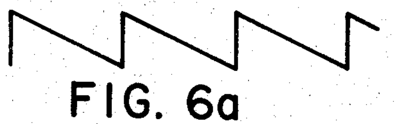
Figure 7:
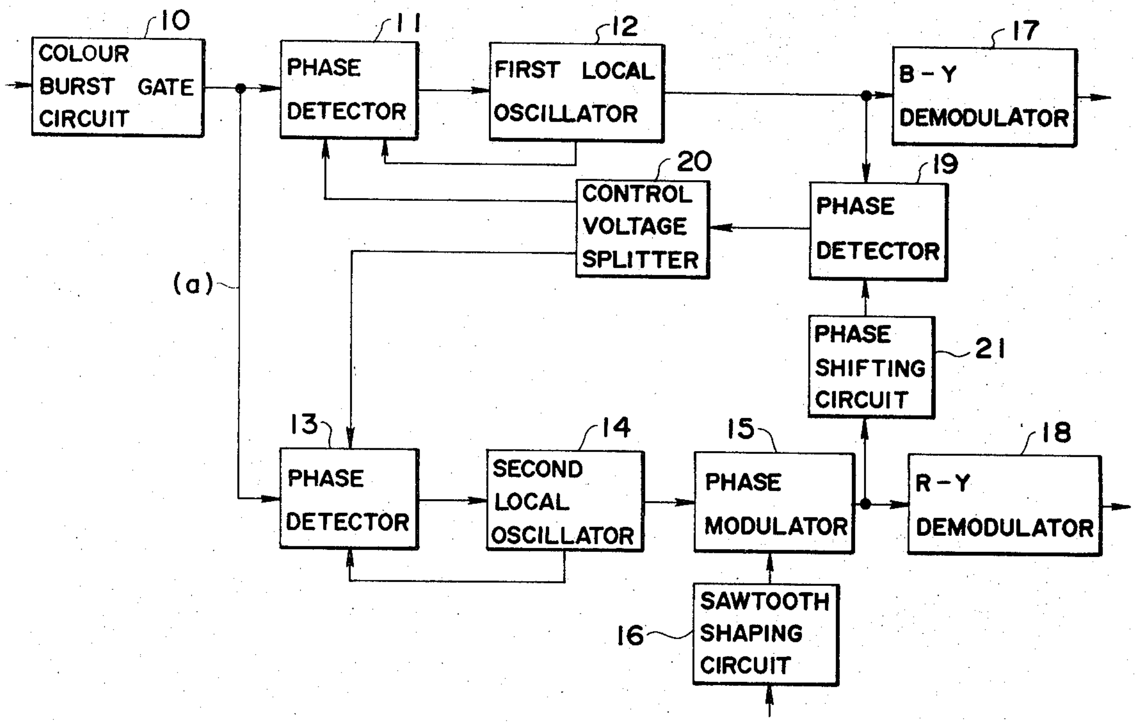
Figure 8:
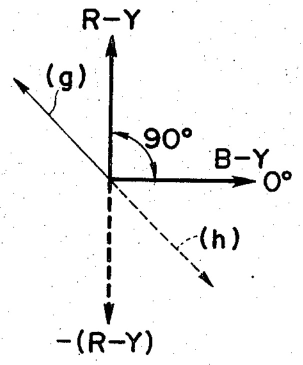
Figure 9:
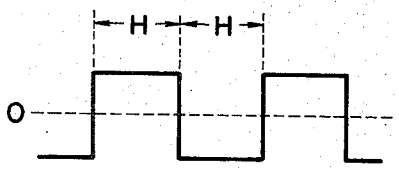
Figure 10:
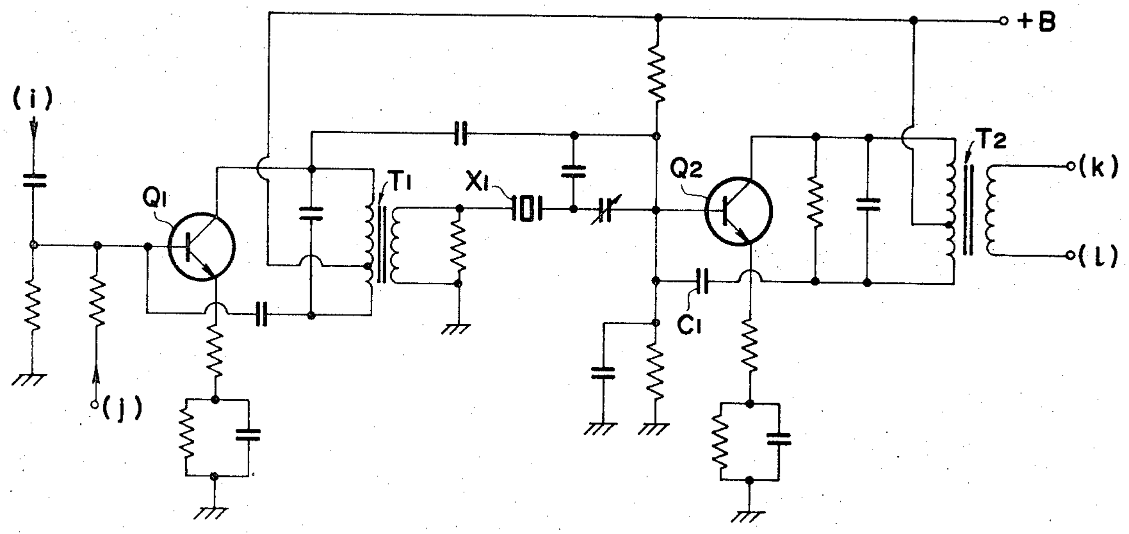

FIGS. 3*a* and 3*b* shows waveform and vector diagrams which illustrate certain signals appearing in the system of FIG. 2, FIG. 4 shows a frequency spectrum of the color burst, FIG. 5 is a schematic diagram illustrating the phase relationship between two signals, FIGS. 6 and 6*a* respectively show a graph illustrating the phase modulation scheme and a saw-tooth wave used in the phase modulation scheme, FIG. 7 is a block diagram of another embodiment of the invention incorporating an automatic phase control circuit, FIG. 8 is a vector diagram illustrating the phase relationship of demodulation axes, FIG. 9 shows the waveform of a control voltage, and FIG. 10 shows an example of a reference subcarrier generator circuit in the form of a burst amplifier incorporating a crystal filter.

Figure 1:
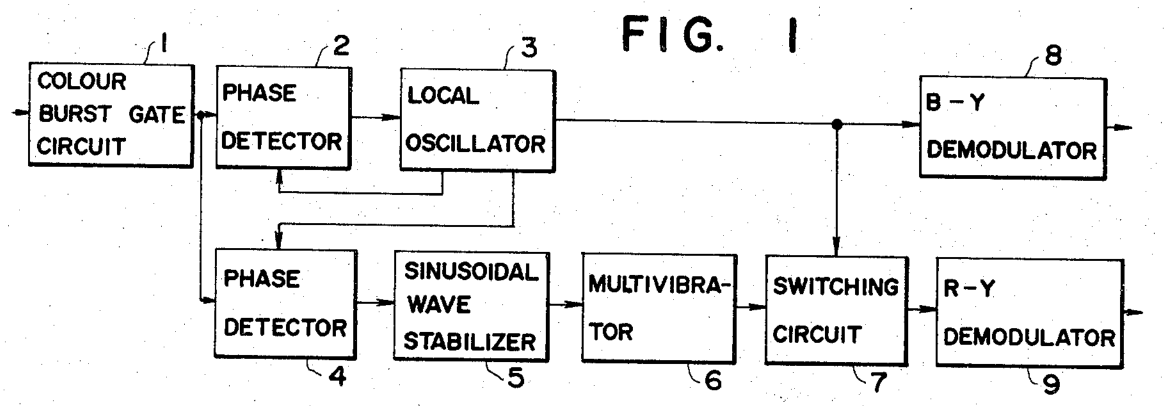
FIG. 1 is a block diagram of a typical prior art demodulation system.

Referring to FIG. 1, there is shown a block diagram of a prior art circuit which produces reference subcarriers for demodulation purpose and which involves the use of a switching circuit. The output from a color burst gate circuit 1 is fed to a phase detector 2 which is connected with a local oscillator 3 or reference subcarrier oscillation circuit. Another phase detector 4 is fed with the outputs of the color burst gate circuit 1 and of the oscillator 3 and produces an identification control voltage at its output. The phase detector 4 is connected with a buffer amplifier or sinusoidal wave stabilizer 5 that is in turn connected through a multivibrator 6 with a switching circuit 7. The output of the oscillator 3 is supplied to a B-Y demodulator 8 and is also supplied through the switching circuit 7 to an R-Y demodulator 9. The operation of such circuitry is well known and hence will not be described in detail here. However, briefly, the multivibrator 6 causes the circuit 7 to switch the phase of the reference subcarrier supplied to the demodulator 9 between 0° and 180°.

FIG. 2 shows an embodiment of the invention. A color burst gate circuit 10 feeds a pair of phase detectors 11 and 13, and the detector 11 is connected with a first local oscillator having the oscillation frequency fsc, that is, the frequency which is equal to the color subcarrier frequency. The phase detector 13 is connected with a second local oscillator having an oscillation frequency that is equal either to fsc ± ½fH or to fsc − ½fH in accordance with the invention, the designation fH representing the horizontal scanning frequency. Further in accordance with the invention, a phase modulator 15 is provided to phase modulate the output of the second local oscillator 14 by a saw-tooth wave having a period H that is supplied from a saw-tooth shaping circuit 16, the period H being the inverse of the horizontal scanning frequency. The first oscillator 12 supplies its output directly to a B-Y demodulator 17, while the output from the second oscillator 14 is passed to an R-Y demodulator 18 through the phase modulator 15.

Components 10, 11 and 12 are those most commonly used for color synchronization purpose in NTSC system as well as in PAL system, and the loop composed by the components 11 and 12 provide an automatic phase control as is well known, and this will not be described in further detail. The output from the color subcarrier oscillator 12 is supplied to the demodulator 17 as a reference subcarrier coincident in phase with the B-Y axis for providing demodulation of B-Y axis component therein.

As shown in FIG. 3*a*, the output from the color burst gate circuit 10 comprises a series of color synchronizing signals having a repetitive period H, which is equal to the inverse of the horizontal scanning frequency. FIG. 3*b* shows the phases of successive burst signals. From FIGS. 3*a* and 3*b* it will be seen that the series of color synchronizing signals repeat themselves with a period of 2H. Thus, referring to FIG. 4, these signals have a frequency spectrum which includes frequency components fsc + ½fH and fsc − ½fH, so that by choosing the oscillation frequency of the automatic frequency control circuit constituted by the components 13 and 14 to be equal to either fsc + ½fH or fsc − ½fH, this circuit can readily be synchronized with one of the first side-band waves. For the purpose of description hereinafter, the oscillation frequency of the oscillator 14 will be selected at fsc + ½fH, but it should be understood that the invention is equally applicable to the selection of fsc − ½fH as the oscillation frequency of the oscillator 14.

Concidering the phase relation between the signal of the frequency fsc + ½fH and the color subcarrier of the frequency fsc, it is readily apparent that the number of cycles of the former signal contained in an interval of 2H is just by one cycle greater than the number of cycles of the latter signal contained in the same interval. Picturizing this, the vector diagram of FIG. 5 illustrates that taking the signal of frequency fsc as a reference, the vector for the signal of frequency fsc + ½fH rotates in a counter-clockwise direction with time. Specifically, assuming that the both signals were in phase at the start of a certain line period, as shown by aligned vectors *c* and *d* in FIG. 5, the signal of the frequency fsc + ½fH gradually advances in phase with time to produce a phase difference of 180° with respect to the other signal at the start of the next line period, this being shown by a vector *e* in FIG. 5. At the start of the next following line period, the both signals will have a phase difference of 360° or become in phase with each other, thus indicating that the vector of the signal of frequency fsc + ½fH has undergone one revolution in a period of 2H.

The phase modulator 15 is operable to fix the phase difference between the signal of frequency fsc + ½fH and the color subcarrier fsc at 0° and 180° during each alternate trace time. In order to accomplish this, a saw-tooth wave as depicted in FIG. 6*a* is supplied from the shaping circuit 16 to the phase modulator 15 for phase modulating the output from the local oscillator 14 (of frequency fsc + ½fH in the present example) whereby its phase undergoes a continuous variation with respect to the color subcarrier at a rate of 180° per line period. Referring to FIG. 6, the vector for the color subcarrier fsc is represented by a reference line $\overline{OG}$, and the output from the local oscillator 14 is shown to undergo a continuous change in phase as depicted by a line $\overline{OBDF}$. When the latter is subjected to phase modulation by a saw-tooth wave (shown in FIG. 6*a*) of the horizontal scanning frequency, it results that the phase of the signal having the frequency of fsc + ½fH varies step-wise by an amount equal to 180°, thus following the path OABCDEF. In the segment $\overline{OA}$, the both signals are in phase, in the segment $\overline{BC}$, they have a phase difference of 180°, in the segment $\overline{DE}$, they have a phase difference of 360° or become in phase again as in the segment $\overline{OA}$, and so on. This means that the output from the phase modulator 15 can be used as a reference subcarrier to demodulate the chrominance signal for deriving R-Y component therefrom.

The saw-tooth wave for this phase modulation may be readily obtained by shaping flyback pulses in the saw-tooth wave shaping circuit 16.

While in the above description, the saw-tooth wave is shown to occupy a full line period, it will apparent to those skilled in the art that each line period includes a flyback time during which there is no need to maintain the reference subcarrier in a particular phase relationship with the color subcarrier, so that the phase modulation with the saw-tooth wave only need to continue for the trace time.

In this manner, the invention avoids the need for a switch for alternately switching between reference color subcarriers of in-phase and of opposite phase, and provides an extremely stable demodulation of the chrominance signal in the PAL system.

However, because the system according to the invention comprises two oscillator circuits to effect the demodulation of R-Y component separately from the demodulation of B-Y component, there may arise a drift in the phase difference between the both reference subcarriers from ± 90° due to differential temperature coefficients and aging effects in the both demodulation systems. To avoid such a disadvantage, the invention provides an automatic phase control circuit to maintain a phase difference of ± 90° exactly between the reference subcarriers used in the demodulation of B-Y and R-Y components.

Referring to FIG. 7 which shows another embodiment of the invention incorporating an automatic phase control circuit, parts similar to those shown in FIG. 2 are designated by same reference numerals, while numerals 19, 20 and 21 denote phase detector, control voltage splitter and amplifier, and phase shifting circuit, respectively, which are added to the system of FIG. 2 for phase control purpose. The phase shifting circuit 21 advances the R-Y demodulation axis a suitable angle, preferably about 45° in phase and also produces an inverse of the resulting signal, as shown at *g* and *h* in FIG. 8, for application to the phase detector 19 while the B-Y demodulation axis is directly applied thereto to effect phase detection, whereby the phase detector 19 produces a square wave as shown in FIG. 9. The square wave is amplitude detected to produce a control voltage, from which the splitter 20 forms two kinds of control voltages, positive and negative, to be applied to the phase detectors 11 and 13, respectively, with suitable polarities to effect phase control in selected directions.

While in the above description, automatic phase control circuits have been illustrated to provide the synchronization of local oscillators, they may comprise burst amplifier including a filter, ringing oscillator, non-quartzcontrolled oscillator or any other similar circuit.

FIG. 10 shows an example of a reference subcarrier generator circuit in the form of a burst amplifier incorporating a crystal filter $X_1$. Two such circuits may be provided, one for the reference subcarrier of the B-Y axis demodulation with $X_1$ selected at the frequency of fsc, and the other for the offset subcarrier of frequency of fsc + ½fH for R-Y axis demodulation with $X_1$ selected at this frequency. In FIG. 10, character $Q_1$ denotes a transistor which forms a burst gate, and $Q_2$ a subcarrier amplifier transistor. It is assumed that the filter $X_1$ includes a quartz oscillator having an oscillation frequency of fsc + ½fH. By applying a chrominance signal to a terminal *i* and applying a gate pulse having a period of H to a terminal *j*, there are extracted at the collector of the transistor $Q_1$ a series of color synchronizing signals such as shown in FIG. 3*a*, which are supplied through a transformer $T_1$ to the crystal filter $X_1$. As described previously in connection with FIG. 4, the series of color synchronizing signals contain a plurality of sidebands including the one having the frequency of fsc + ½fH. Since the crystal filter $X_1$ has a resonance frequency at fsc + ½fH and has a sufficiently high Q-Value to permit a limited pass band of several hundred Hz to less, only that one of the sidebands which has the frequency of fsc + ½fH is allowed to pass therethrough to be amplified by the transistor $Q_2$, thereby producing a continuous subcarrier having the desired frequency of fsc + ½fH across a pair of output terminals *k* and *l*. This subcarrier output can be applied to the phase modulator 15 shown in FIG. 2 to be subjected to phase modulation with a sawtooth wave having the period of H for producing the instantaneous reference subcarrier to be used in the R-Y axis demodulation.

The circuit shown in FIG. 10 may be modified into a ringing oscillator incorporating a crystal filter, by eliminating a neutralizing capacitor $C_1$ and slightly changing circuit parameters so that the transistor $Q_2$ forms an oscillator. Again, a continuous subcarrier having the frequency of fsc + ½fH can be obtained.

In the above description, the frequency of the offset subcarrier has been chosen at fsc + ½fH, which is a most convenience choice in practising the invention. However, in principle, such frequency may be any one of the frequencies generally expressed as fsc ± $(2n - 1)/2$ fH, where $n$ denotes a positive integer at which these frequencies are fsc ± ½fH. For values of $n$ other than null, the phase modulation with a sawtooth wave having the period of H, applied to such offset subcarriers, produces the instantaneous reference subcarrier in a similar manner for use in the R-Y axis demodulation.

While in the above description, the phase modulator 15 has been termed as such, its function may be considered as that of frequency modulation. The term "phase modulation" is used herein in this sense.

While the invention has been described above primarily in connection with the demodulation of R-Y color difference signal, it will be obvious that the system according to the invention also includes another local oscillator for the demodulation of B-Y component, as illustrated in FIG. 2. Thus the invention provides a color reproduction by the demodulation of a color television signal of PAL system by using two local oscillators, one having the frequency of fsc and the other having the frequency of fsc + ½fH. In this manner, the invention provides a demodulator which is inexpensive and highly stabilized in operation against noises. No color television receiver of either NTSC or PAL system has ever employed two local oscillators having different oscillation frequencies as described herein.

Having described the invention, what is claimed is:

1. A color television receiver for use in a transmission system such as PAL system in which a pair of color signals provides quadrature balanced modulation of a color subcarrier simultaneously with respect to mutually orthogonal modulation axes with one of the axes being reversed 180° for alternate horizontal scanning lines and in which the resulting color television signal contains a color synchronizing signal capable of providing distinction of the polarity of the color subcarrier that is reversed, comprising means for providing an offset subcarrier of a frequency of fsc ± $(2n - 1)/2$ fH for use in the demodulation, where fsc denotes a color subcarrier frequency, fH horizontal scanning frequency, and n a positive integer, and means for phase modulating the offset subcarrier with a sawtooth wave of a scanning line frequency.

2. A color television receiver according to claim 1, in which the offset subcarrier is cause to be synchronized with one of the sidebands of the color synchronizing signal.

3. A color television receiver according to claim 2, further including an automatic phase control means comprising an oscillator having a resonance frequency of fsc + $(2n - 1)/2$ fH or fsc − $(2n - 1)/2$ fH, a reactance element and a phase detector, the automatic phase control means being synchronized with one of the sidebands of a color burst received.

4. A color television receiver according to claim 1, further including a burst amplifier incorporating a crystal filter having a resonance frequency of fsc + $(2n - 1)/2$ fH or fsc − $(2n - 1)/2$ fH, said burst amplifier being used to amplify one of the sidebands of a color burst received, thereby producing a continuous subcarrier of said frequency.

5. A color television receiver according to claim 1, further including a ringing oscillator incorporating a crystal filter having a resonance frequency of fsc + $(2n - 1)/2$ fH or fsc − $(2n - 1)/2$ fH, the ringing oscillator being synchronized with one of the sidebands of a color burst received.

6. A color television receiver for use in a transmission system such as PAL system in which a pair of color signals provide quadrature balanced modulation of a color subcarrier simultaneously with respect to mutually orthogonal modulation axes with one of the axes being reversed 180° for alternate horizontal scanning lines and in which the resulting color television signal contains a color synchronizing signal capable of providing distinction of the polarity of the color subcarrier that is reversed, comprising means providing a reference subcarrier, adapted for synchronization with a fundamental wave of the color synchronizing signal for providing a first demodulated signal along the unreversed axis, said reference subcarrier being of the same frequency as the color subcarrier frequency, an instantaneous reference subcarrier for providing a second demodulated signal along said one of said axes, and means for producing said instantaneous reference subcarrier and comprising means providing an offset subcarrier of a frequency of fsc ± $(2n-1)/2$ fH, where fsc denotes the color subcarrier frequency, fH the horizontal line frequency and n a positive interger, and a sawtooth wave of said horizontal line frequency for phase modulating said offset subcarrier synchronized with one of the side bands of the color synchronizing signal.

7. A color television receiver according to claim 6, further comprising means including a control voltage and an automatic phase control circuit operable thereby to maintain the phase difference between the reference subcarriers used for the orthogonal axes demodulation at ± 90° during trace time.

* * * * *